United States Patent [19]

Tanaka et al.

[11] Patent Number: 4,556,929
[45] Date of Patent: Dec. 3, 1985

[54] MULTI-LAYER CERAMIC CAPACITOR

[75] Inventors: Yukio Tanaka, Tsuruga; Yoshikazu Chigodo, Fukui, both of Japan

[73] Assignee: Murata Manufacturing Co. Ltd., Japan

[21] Appl. No.: 627,792

[22] Filed: Jul. 5, 1984

[30] Foreign Application Priority Data

Jul. 8, 1983 [JP] Japan ................................ 58-125128

[51] Int. Cl.$^4$ .............................................. H01G 4/42
[52] U.S. Cl. .................................................... 361/321
[58] Field of Search ................................ 361/304–306, 361/308–310, 320, 321, 323, 328; 29/25.42

[56] References Cited

U.S. PATENT DOCUMENTS

| 2,828,454 | 3/1958 | Khouri | 361/304 X |
| 3,539,886 | 11/1970 | Kellerman | 29/25.42 X |
| 3,668,482 | 6/1972 | Chalmers | 29/25.42 X |
| 4,082,906 | 4/1978 | Amin et al. | 361/309 X |
| 4,419,713 | 12/1983 | Levinson | 361/321 |
| 4,424,615 | 1/1984 | Wakino | 361/321 X |

FOREIGN PATENT DOCUMENTS 1010645 6/1957 Fed. Rep. of Germany ...... 361/328

Primary Examiner—Donald A. Griffin
Attorney, Agent, or Firm—Ostrolenk, Faber, Gerb & Soffen

[57] ABSTRACT

A multi-layer ceramic capacitor includes a rectangular ceramic body with terminal electrodes provided on its opposite ends. A set of electrode, including a plurality of electrode layers, extends from one terminal electrode into the ceramic body. A similar set of electrode extends from the other terminal electrode into the ceramic body. The plurality of electrode layers have their edges arranged in tiers and, therefore, the equipotential surfaces appearing around the tip end of electrode layers can be dispersed.

17 Claims, 15 Drawing Figures

MULTI-LAYER CERAMIC CAPACITOR

BACKGROUND OF THE INVENTION

1. Field of the invention

The present invention relates to a multi-layer type ceramic capacitor which has a high dielectric strength to a high voltage.

2. Description of the Prior Art

A multi-layer type ceramic capacitor according to one prior art has, as shown in FIG. 1, a ceramic body 1, a pair of terminal electrodes 2 and 3 deposited at opposite sides of the ceramic body 1, and internal electrodes 4 extending from terminal electrodes 2 and 3 through the body 1 interleavingly. The multi-layer type ceramic capacitor of this type is applicable for both high and low capacitance capacitors.

When in use particularly with a high voltage applied across terminal electrodes 2 and 3, the potential gradient becomes very steep at tip end of each internal electrode 4. In other words, as shown in FIG. 2, when a high voltage is applied across the interleaving electrodes 4 and 4, the equipotential surfaces, indicated by solid lines, appear concentrated at a place adjacent the tip end of electrode 4. Accordingly, the prior art multi-layer type ceramic capacitor has a poor dielectric strength to a high voltage.

SUMMARY OF THE INVENTION

The present invention has been developed with a view to substantially solving the above described disadvantage and has for its essential object to provide an improved multi-layer ceramic capacitor which has a dielectric strength to a high voltage.

It is also an essential object of the present invention to provide a multi-layer ceramic capacitor of the above described type which can be simply manufactured with hardly any extra cost.

In accomplishing these and other objects, a multi-layer ceramic capacitor according to the present invention comprises a ceramic body with terminal electrodes provided on its opposite ends. A set of electrode, including a plurality of electrode layers, extends from one terminal electrode into the ceramic body. A similar set of electrode extends from the other terminal electrode into the ceramic body. The plurality of electrode layers have their edges arranged in tiers and, therefore, the equipotential surfaces appearing around the tip end of electrode layers can be dispersed.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENTS

Figure 3:
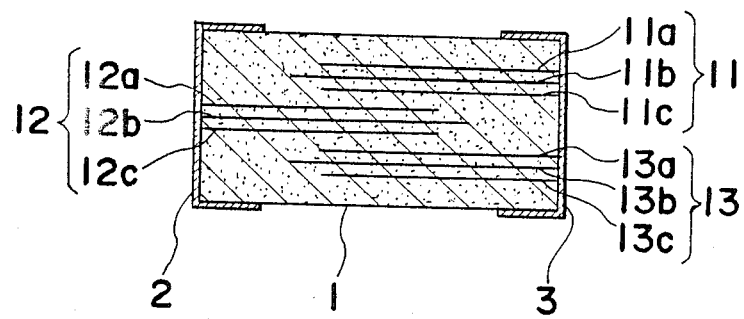
FIG. 3 is a cross-sectional view of a multi-layer ceramic capacitor according to a first embodiment of the present invention.

Referring to FIG. 3, a cross-sectional view of a multi-layer ceramic capacitor according to a first embodiment of the present invention is shown. The capacitor comprises a ceramic body 1, a pair of terminal electrodes 2 and 3 deposited at opposite sides of the ceramic body 1, and internal electrode layers 12a, 12b and 12c (generally referred to as an electrode 12) which extend from terminal electrode 2 through the body 1. The capacitor further comprises internal electrode layers 13a, 13b and 13c (generally referred to as an electrode 13) which extend from terminal electrode 3 at a level above the electrode 12 and parallelly thereto, and electrode layers 14a, 14b and 14c (generally referred to as an electrode 14) which extend from terminal electrode 3 at a level below the electrode 12 and parallelly thereto. The electrodes 11, 12 and 13 are interleaving with each other and, therefore, they are referred to as interleaving electrodes.

Figure 4A:
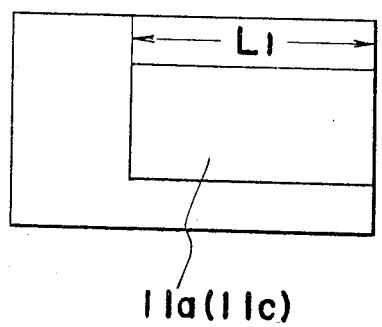
FIGS. 4(a) and 4(b) are top plan views showing the steps to construct the multi-layer ceramic capacitor of FIG. 3.
Figure 4B:
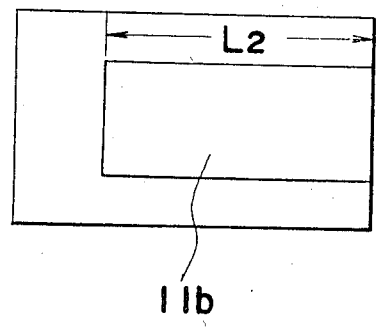

Electrode 11 is formed in the following manner. As shown in FIG. 4(a), electrode layer 11a is formed by a rectangular film of electric conductive material deposited on a ceramic sheet with one edge of the film in alignment with the edge of the ceramic sheet. Similarly, as shown in FIG. 4(b), electrode layer 11b is formed by a rectangular film of electric conductive material deposited on another ceramic sheet. Furthermore, electrode layer 11c is formed in the same manner as the electrode layer 11a, but on yet another ceramic sheet. As understood from FIGS. 4(a) and 4(b), the length L2 of the middle electrode layer 11b is greater than the length L1 of the side electrodes 11a and 11c.

Electrodes 12 and 13 are formed in a similar manner to electrode 11. The ceramic sheets deposited with electrodes are mounted one over the other to place the internal electrodes in a manner shown in FIG. 3 and, thereafter, the ceramic sheets are applied with a pressure and are fired to define a solid ceramic body 1 with a plurality of electrodes held therein. The terminal electrodes 2 and 3 may be provided before or after the firing. A required capacitance between terminal electrodes 2 and 3 is obtained by the sum of capacitances between electrodes 11 and 12 and between electrodes 12 and 13, which are connected parallel between terminal electrodes 2 and 3.

Figure 1:
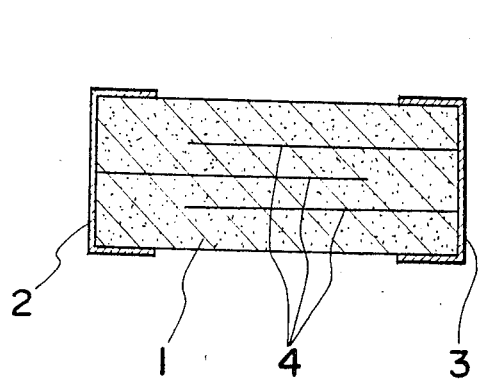
FIG. 1 is a cross-sectional view of a multi-layer ceramic capacitor according to one prior art.
Figure 2:
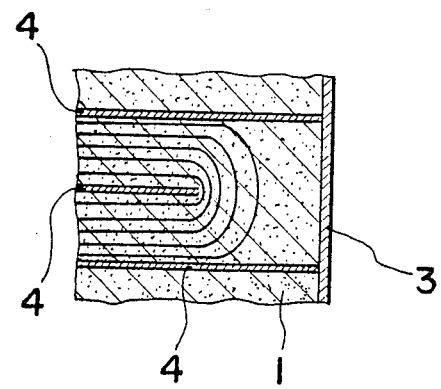
FIG. 2 is a diagram showing the equipotential surfaces around the tip end of an internal electrode in the multi-layer ceramic capacitor of FIG. 1.
Figure 5:
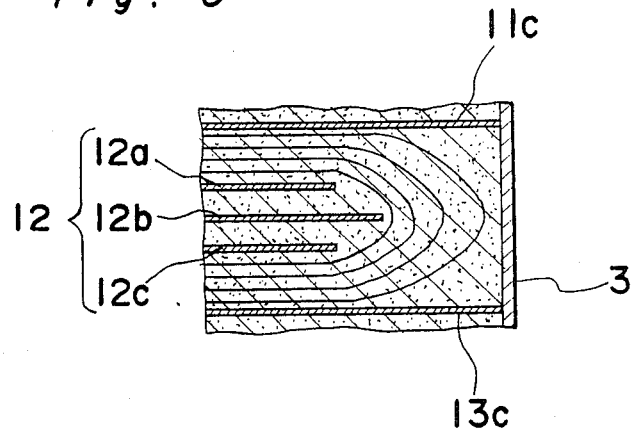
FIG. 5 is a diagram showing the equipotential surfaces around the tip ends of internal electrodes in the multi-layer ceramic capacitor of FIG. 3.

According to the present invention, as shown in FIG. 5, since the electrode layers have their edges arranged in tiers, that is, since the middle electrode layer 12b has its tip end positioned outside a space defined between side electrode layers 12a and 12c, the equipotential surfaces appearing around the tip end of electrode layer 12b can be dispersed, that is, the equipotential surfaces are not as much concentrated as the prior art described above in connection with FIG. 2. The same can be said to other electrodes 11 and 13.

Figure 6A:
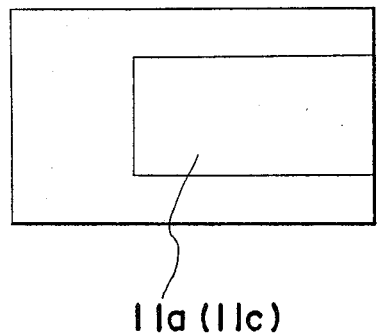
FIGS. 6(a) and 6(b) are views similar to FIGS. 4a and 4b, but showing a modification thereof.
Figure 6B:
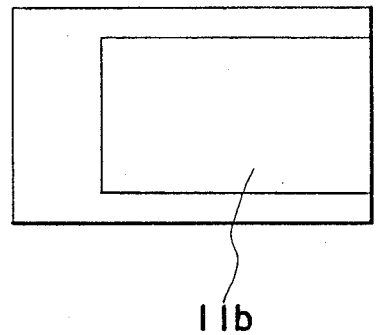
Figure 7:
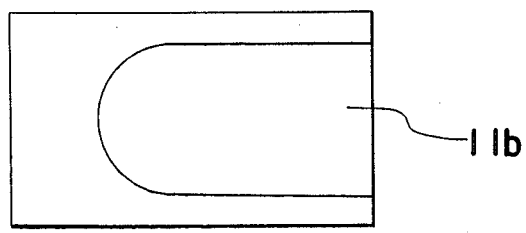
FIG. 7 is a top plan view showing another manner for depositing the internal electrode.

Referring to FIGS. 6(a) and 6(b), the middle electrode layer 11b can be arranged not only longer, but also wider than the side electrode layers 11a and 11c. When this arrangement is employed, the equipotential surfaces appearing around the side edges of the middle electrode layer 11b can be dispersed. Instead of a rectangular, any of the electrode layers can be formed with a rounded end as shown in FIG. 7.

Figure 8:
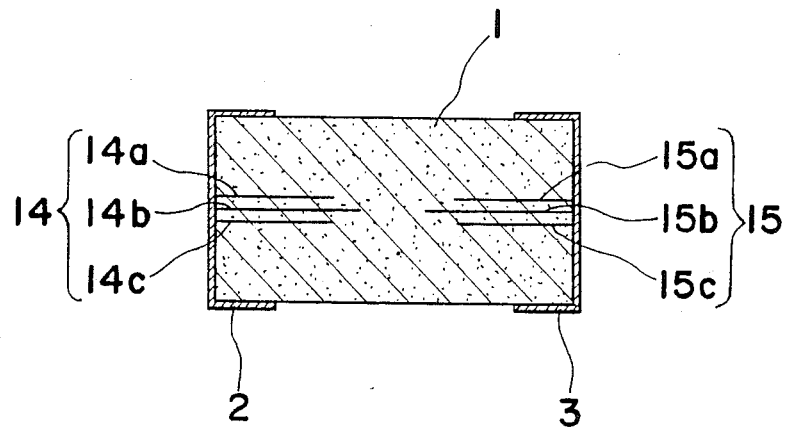
FIG. 8 is a cross-sectional view of a multi-layer ceramic capacitor according to a second embodiment of the present invention.

Referring to FIG. 8, a cross-sectional view of a multi-layer ceramic capacitor according to a second embodiment of the present invention is shown. In this embodiment, one pair of electrodes 14 and 15 are provided at the same level, pointing to each other. More specifically, electrode layers 14a, 14b and 14c are provided at the same level as electrode layers 15a, 15b and 15c, respectively. Therefore, in contrast to the interleaving electrodes mentioned above, such electrodes 14 and 15 are referred to as pointing electrodes. A required capacitance is obtained between electrodes 14 and 15, particularly between the tip ends thereof. As apparent from FIG. 8, the middle electrode layer 14b (15b) has its tip end positioned outside the space defined between side electrode layers 14a and 14c (15a and 15c). Accordingly, the equipotential surfaces appearing around the tip end of electrode layer 14b (15b) can be dispersed.

The embodiment shown in FIG. 8 has one pair of pointing electrodes 14 and 15, but it is possible to provide two or more pairs of pointing electrodes.

Figure 9:
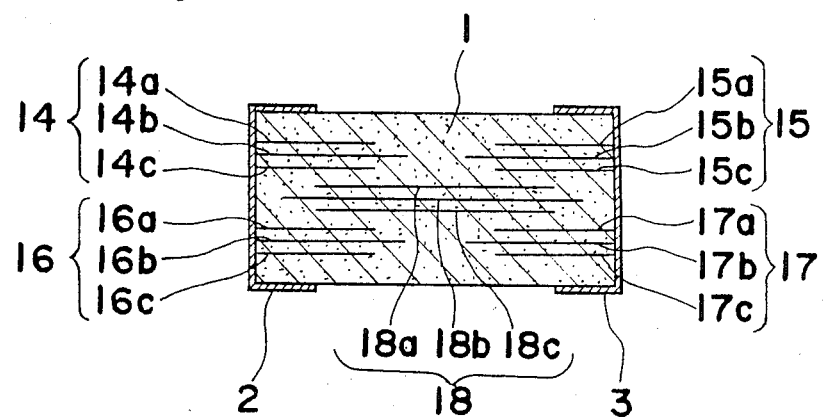
FIG. 9 is a cross-sectional view of a multi-layer ceramic capacitor according to a third embodiment of the present invention.

Referring to FIG. 9, a cross-sectional view of a multi-layer ceramic capacitor according to a third embodiment of the present invention is shown. In this embodiment, there are two pairs of pointing electrodes 14, 15 and 16, 17. The pointing electrode 14 is defined by electrode layers 14a, 14b and 14c. The pointing electrode 15 is defined by electrode layers 15a, 15b and 15c. The pointing electrode 16 is defined by electrode layers 16a, 16b and 16c. The pointing electrode 17 is defined by electrode layers 17a, 17b and 17c. Between the two pairs, an intermediate electrode 18, defined by electrode layers 18a, 18b and 18c, is provided, such that the electrode layers 18a, 18b and 18c are completely mounted within the ceramic body 1. With the arrangement shown in FIG. 9, a capacitance is produced between electrodes 14 and 18, and another capacitance is produced between electrodes 18 and 15. Similarly, a capacitance is produced between electrodes 16 and 18, and another capacitance is produced between electrodes 18 and 17. Thus, two capacitances are connected parallel, and two sets of these parallel connections are connected in series between terminal electrodes 2 and 3.

Figure 10:
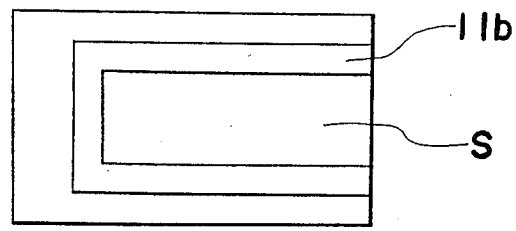
FIG. 10 is a top plan view showing a further different manner for depositing the internal electrode.

In any of the embodiments described above, the middle electrode layer 11b, 12b, 13b, 14b, 15b, 16b, 17b or 18b is not provided to directly confront the opposing electrode and, therefore, it does not accumulate so many charges as the side electrode layers. Accordingly, to save the material for the electrode layers, the middle electrode layer can be so arranged as to remove the center portion thereof, thereby presenting the middle electrode, for example, in a U-shaped stripe, such as shown in FIG. 10, thereby providing a portion S where the electrode is not deposited. The width of the stripe should be wide enough to disperse the equipotential surfaces appearing around the edges of the middle electrode layer.

Furthermore, in the case where the electrodes employed are only the pointing electrodes, such as in the embodiment of FIG. 8, all the electrode layers can be arranged in the U-shaped stripe.

Figure 11:
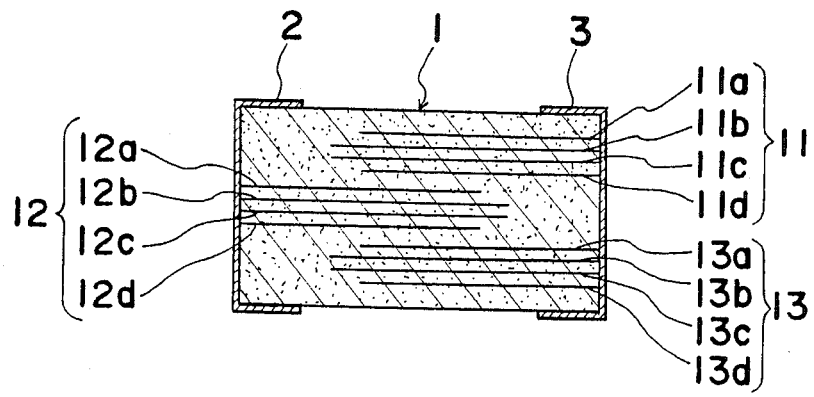
FIGS. 11, 12 and 13 are cross-sectional views of multi-layer ceramic capacitors according to fourth, fifth and sixth embodiments.

Referring to FIG. 11, a cross-sectional view of a multi-layer ceramic capacitor according to a fourth embodiment of the present invention is shown. This embodiment has an arrangement similar to FIG. 3, but with two middle electrode layers, such as 12b and 12c. The two middle electrode layers 12b and 12c have the same configuration to each other, and are greater in size than the opposite side electrode layers 12a and 12d. Other electrodes 11 and 13 have the same arrangement as the electrode 12. Accordingly, by the employment of two middle electrode layers, the equipotential surfaces appearing around the edges of the electrode layers can be further dispersed than the embodiment of FIG. 3.

Figure 12:
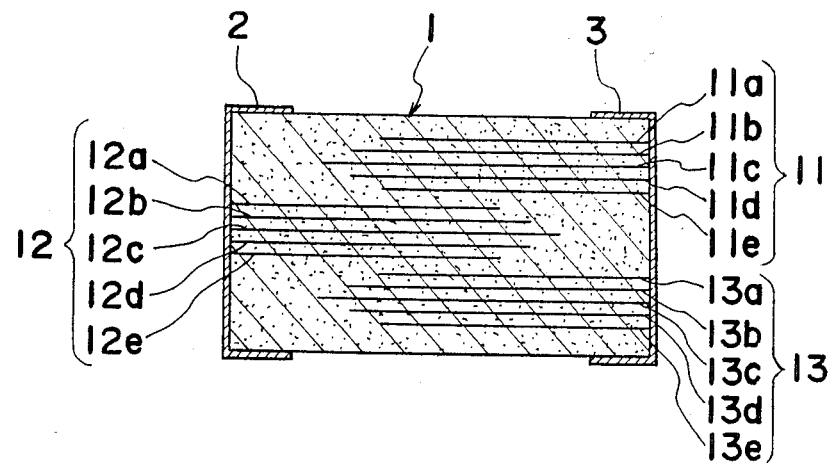

Referring to FIG. 12, a cross-sectional view of a multi-layer ceramic capacitor according to a fifth embodiment of the present invention is shown. When compared with the fourth embodiment, this embodiment further has a center electrode layer, for example 12c, between two middle electrode layers 12b and 12d. The center electrode layer 12c has a size greater than the two middle electrode layers 12b and 12d, and the two middle electrode layers 12b and 12d have a size greater than the two opposite side electrode layers 12a and 12e. Other electrodes 11 and 13 have the same arrangement as the electrode 12. Accordingly, by the employment of the center electrode layer between two middle electrode layers, the equipotential surfaces appearing around the edges of the electrode layers can be further dispersed than the embodiment of FIG. 11.

As understood from the foregoing embodiments, a plurality of electrode layers can be used for one electrode so long as the side of the electrode layers decreases towards the neighboring electrode.

In the embodiments of FIGS. 11 and 12, electrode layers other than the opposite side electrode layers can be arranged in the U-shaped stripe, as shown in FIG. 10.

Figure 13:
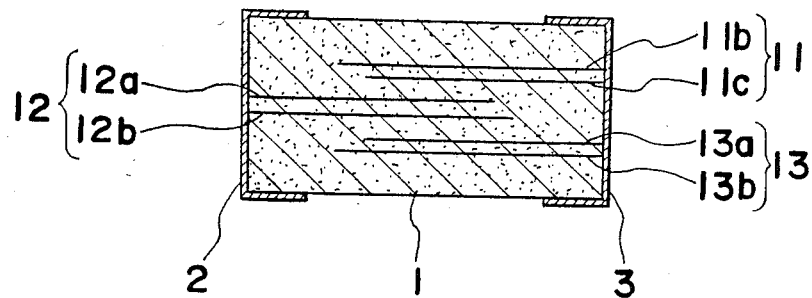

Referring to FIG. 13, a cross-sectional view of a multi-layer ceramic capacitor according to a sixth embodiment of the present invention is shown. This embodiment has an arrangement similar to FIG. 3, but with only two electrode layers for each electrode: a large electrode layer and a small electrode layer. For example, as to the electrodes 11 and 13 located at the ends, the small electrode layer, such as 11c is positioned at the inner side facing the opposite electrode 12, and the large electrode layer such as 11b is positioned outer side.

When the two electrode layer arrangement is employed in the embodiment of FIG. 8, it is preferable to provide the small electrode layer of electrode 14 and the large electrode layer of electrode 15 in the same level, and the large electrode layer of electrode 14 and the small electrode layer of electrode 15 in the same level.

Since the multi-layer ceramic capacitor according to the present invention can disperse the equipotential surfaces appearing around the edges of the electrode layer, it has a high dielectric strength to a high voltage and, at the same time, the frequency characteristic can be improved.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. A multi-layer ceramic capacitor comprising:
a ceramic body having first and second surfaces;
first and second terminal electrodes provided on said first and second surfaces, respectively;
at least one set of electrode extending from said first surface into said ceramic body and electrically connected to said first terminal electrode, said one set of electrode including a plurality of electrode layers extending substantially parallel to each other, said plurality of electrode layers having their edges arranged in tiers; and
at least one set of electrode extending from said second surface into said ceramic body and electrically connected to said second terminal electrode, said one set of electrode including a plurality of electrode layers extending substantially parallel to each other and also to said first mentioned set of electrode, said plurality of electrode layers having their edges arranged in tiers, thereby dispersing the equipotential surfaces appearing around an edge portion of said electrode layers.

2. A multi-layer ceramic capacitor as claimed in claim 1, wherein each set of electrode includes first and second electrode layers with the first electrode layer being larger in size than the second electrode layer, said first electrode layer of said one set of electrode being positioned away from the other set of electrode.

3. A multi-layer ceramic capacitor as claimed in claim 1, wherein said set of electrode includes first, second and third electrode layers with the second electrode layer being positioned between the first and third electrode layers, said second electrode layer having at least a tip end portion thereof positioned outside a space defined between said first and third electrode layers.

4. A multi-layer ceramic capacitor as claimed in claim 3, wherein said second electrode layer of said set of electrode is arranged such that a center portion thereof is removed.

5. A multi-layer ceramic capacitor as claimed in claim 3, wherein said second electrode layer of said set of electrode is arranged in a stripe in a U-shaped configuration.

6. A multi-layer ceramic capacitor as claimed in claim 3, wherein said second electrode layer of said set of electrode has a side edge portion thereof positioned outside a space defined between said first and second electrode layers.

7. A multi-layer ceramic capacitor as claimed in claim 1, wherein said set of electrode includes first, second, third and fourth electrode layers with the second and third electrode layer being positioned between the first and fourth electrode layers, said second and third electrode layer having at least a tip end portion thereof positioned outside a space defined between said first and fourth electrode layers.

8. A multi-layer ceramic capacitor as claimed in claim 7, wherein said second and third electrode layers of said set of electrode are arranged such that a center portion thereof is removed.

9. A multi-layer ceramic capacitor as claimed in claim 7, wherein said second and third electrode layers of said set of electrode are arranged in a stripe in a U-shaped configuration.

10. A multi-layer ceramic capacitor as claimed in claim 1, wherein said set of electrode includes first, second, third, fourth and fifth electrode layers with the third electrode layer being positioned between the second and fourth electrode layers, and the second, third and four electrode layers being positioned between the first and fifth electrode layers, said second and fourth electrode layers having at least a tip end portion thereof positioned outside a space defined between said first and fifth electrode layers, and said third electrode layer having at least a tip end portion thereof positioned outside a space defined between said second and fourth electrode layers.

11. A multi-layer ceramic capacitor as claimed in claim 10, wherein said second, third and fourth electrode layers of said set of electrode are arranged such that a center portion thereof is removed.

12. A multi-layer ceramic capacitor as claimed in claim 10, wherein said second, third and fourth electrode layers of said set of electrode are arranged in a stripe in a U-shaped configuration.

13. A multi-layer ceramic capacitor comprising:
a ceramic body having first and second surfaces;
first and second terminal electrodes provided on said first and second surfaces, respectively;
first set of electrode extending from said first surface into said ceramic body and electrically connected to said first terminal electrode, said first set of electrode including a plurality of electrode layers extending substantially parallel to each other, said plurality of electrode layers having their edges arranged in tiers; and
second set of electrode extending from said second surface into said ceramic body and electrically connected to said second terminal electrode, said second set of electrode including a plurality of electrode layers extending substantially parallel to each other and also to said first set of electrode, said plurality of electrode layers having their edges arranged in tiers, thereby dispersing the equipotential surfaces appearing around an edge portion of said electrode layers.

14. A multi-layer ceramic capacitor as claimed in claim 13, wherein said first, second and third electrode layers of said first set of electrode are positioned at the same level as said first, second and third electrode layers of said second set of electrode.

15. A multi-layer ceramic capacitor comprising:
a ceramic body having first and second surfaces;
first and second terminal electrodes provided on said first and second surfaces, respectively;
first set of electrode extending from said first surface into said ceramic body and electrically connected to said first terminal electrode, said first set of electrode including a plurality of electrode layers extending substantially parallel to each other, said plurality of electrode layers having their edges arranged in tiers;
second set of electrode extending from said second surface into said ceramic body and electrically connected to said second terminal electrode, said second set of electrode including a plurality of electrode layers extending substantially parallel to each other and also to said first set of electrode, said plurality of electrode layers having their edges arranged in tiers; and third set of electrode extending from said first surface into said ceramic body and electrically connected to said first terminal electrode, said second set of electrode positioned between said first and third sets of electrode, said third set of electrode including a plurality of electrode layers extending substantially parallel to each other and also to said first and second sets of electrode, said plurality of electrode layers having their edges arranged in tiers, thereby dispersing the equipotential surfaces appearing around an edge portion of said electrode layers.

16. A multi-layer ceramic capacitor comprising:

a ceramic body having first and second surfaces;

first and second terminal electrodes provided on said first and second surfaces, respectively;

first set of electrode extending from said first surface into said ceramic body and electrically connected to said first terminal electrode, said first set of electrode including a plurality of electrode layers extending substantially parallel to each other, said plurality of electrode layers having their edges arranged in tiers;

second set of electrode extending from said second surface into said ceramic body and electrically connected to said second terminal electrode, said second set of electrode including a plurality of electrode layers extending substantially parallel to each other and also to said first set of electrode, said plurality of electrode layers having their edges arranged in tiers;

third set of electrode extending inside said ceramic body, said third set of electrode including a plurality of electrode layers extending substantially parallel to each other and provided adjacent but in an electrically insulated manner from any of said first and second set of electrodes so as to partly confronting said third set of electrode with each of said first and second sets of electrodes, said plurality of electrode layers having their edges arranged in tiers, thereby dispersing the equipotential surfaces appearing around an edge portion of said electrode layers.

17. A multi-layer ceramic capacitor comprising:

a ceramic body having first and second surfaces;

first and second terminal electrodes provided on said first and second surfaces, respectively;

first set of electrode extending from said first surface into said ceramic body and electrically connected to said first terminal electrode, said first set of electrode including a plurality of electrode layers extending substantially parallel to each other, said plurality of electrode layers having their edges arranged in tiers;

second set of electrode extending from said second surface into said ceramic body and electrically connected to said second terminal electrode, said second set of electrode including a plurality of electrode layers extending substantially parallel to each other and also to said first set of electrode, said plurality of electrode layers having their edges arranged in tiers;

third set of electrode extending from said first surface into said ceramic body and electrically connected to said first terminal electrode, said third set of electrode including a plurality of electrode layers extending substantially parallel to each other, said plurality of electrode layers having their edges arranged in tiers;

fourth set of electrode extending from said second surface into said ceramic body and electrically connected to said second terminal electrode, said fourth set of electrode including a plurality of electrode layers extending substantially parallel to each other and also to said third set of electrode, said plurality of electrode layers having their edges arranged in tiers;

fifth set of electrode extending inside said ceramic body, said fifth set of electrode including a plurality of electrode layers extending substantially parallel to each other and provided adjacent but in an electrically insulated manner from any of said first, second, third and fourth set of electrodes so as to partly confronting said fifth electrode with each of said first, second, third and fourth sets of electrodes, said plurality of electrode layers having their edges arranged in tiers, thereby dispersing the equipotential surfaces appearing around an edge portion of said electrode layers.

* * * * *